United States Patent [19]

Matsukawa et al.

[11] Patent Number: 5,402,203
[45] Date of Patent: Mar. 28, 1995

[54] CAMERA WITH AUTOMATIC BRACKETING DEVICE

[75] Inventors: Nobuo Matsukawa, Tokyo; Yasuaki Ishiguro, Fujimi; Masao Owashi, Kawasaki; Masaaki Tsukamoto, Fujisawa; Ryuichi Mori, Yokohama, all of Japan

[73] Assignee: Nikon Corporation, Tokyo, Japan

[21] Appl. No.: 3,613

[22] Filed: Jan. 13, 1993

[30] Foreign Application Priority Data

Jan. 24, 1992 [JP] Japan ................................. 4-034411

[51] Int. Cl.$^6$ .............................................. G03B 7/08
[52] U.S. Cl. ..................................... 354/441; 354/456; 354/266; 354/217
[58] Field of Search ............... 354/410, 412, 441, 442, 354/443, 444, 445, 456, 458, 266, 217, 218

[56] References Cited

U.S. PATENT DOCUMENTS

| | | | |
|---|---|---|---|
| 3,762,285 | 10/1973 | Tenkumo | 354/458 |
| 4,676,624 | 6/1987 | Kiuchi et al. | 354/410 |
| 4,734,727 | 3/1988 | Takemae | 354/412 |
| 4,812,870 | 3/1989 | Kawamura | 354/412 |
| 4,862,205 | 8/1989 | Kawamura | 354/412 |
| 4,914,466 | 4/1990 | Wakabayashi et al. | 354/412 |
| 4,918,481 | 4/1990 | Yasukawa et al. | 354/412 |
| 4,933,700 | 6/1990 | Ikeda et al. | 354/412 |
| 4,974,012 | 11/1990 | Ohsawa | 354/474 |
| 5,019,846 | 5/1991 | Goto et al. | 354/217 |
| 5,164,758 | 11/1992 | Satou et al. | 354/412 |
| 5,177,519 | 1/1993 | Goto et al. | 354/266 |

FOREIGN PATENT DOCUMENTS 61-148437 7/1986 Japan .

*Primary Examiner*—Russell E. Adams
*Attorney, Agent, or Firm*—Shapiro and Shapiro

[57] ABSTRACT

A camera with an automatic bracketing device for permitting photographing of a plurality of frames in group while exposure is stepwise changed under a certain exposure condition solves a problem which is caused when the number of frames to be photographed in a bracketing photographing mode is set larger than the number of remaining available frames of a film.

The camera comprises means for calculating the number of remaining available frames based on the number of available frames of the film loaded and the number of photographed frames, means for calculating a proper exposure, means for setting the number of frames to be photographed in a bracketing photographing mode in which a plurality of frames are photographed with changing exposures, and means for setting the number of steps of exposure to be changed in the bracketing photographing mode. When the set number of frames to be photographed is larger than the number of remaining available frames, the set number of frames to be photographed is automatically changed to a number which is no larger than the number of remaining available frames so that a frame with the proper exposure is photographed.

4 Claims, 5 Drawing Sheets

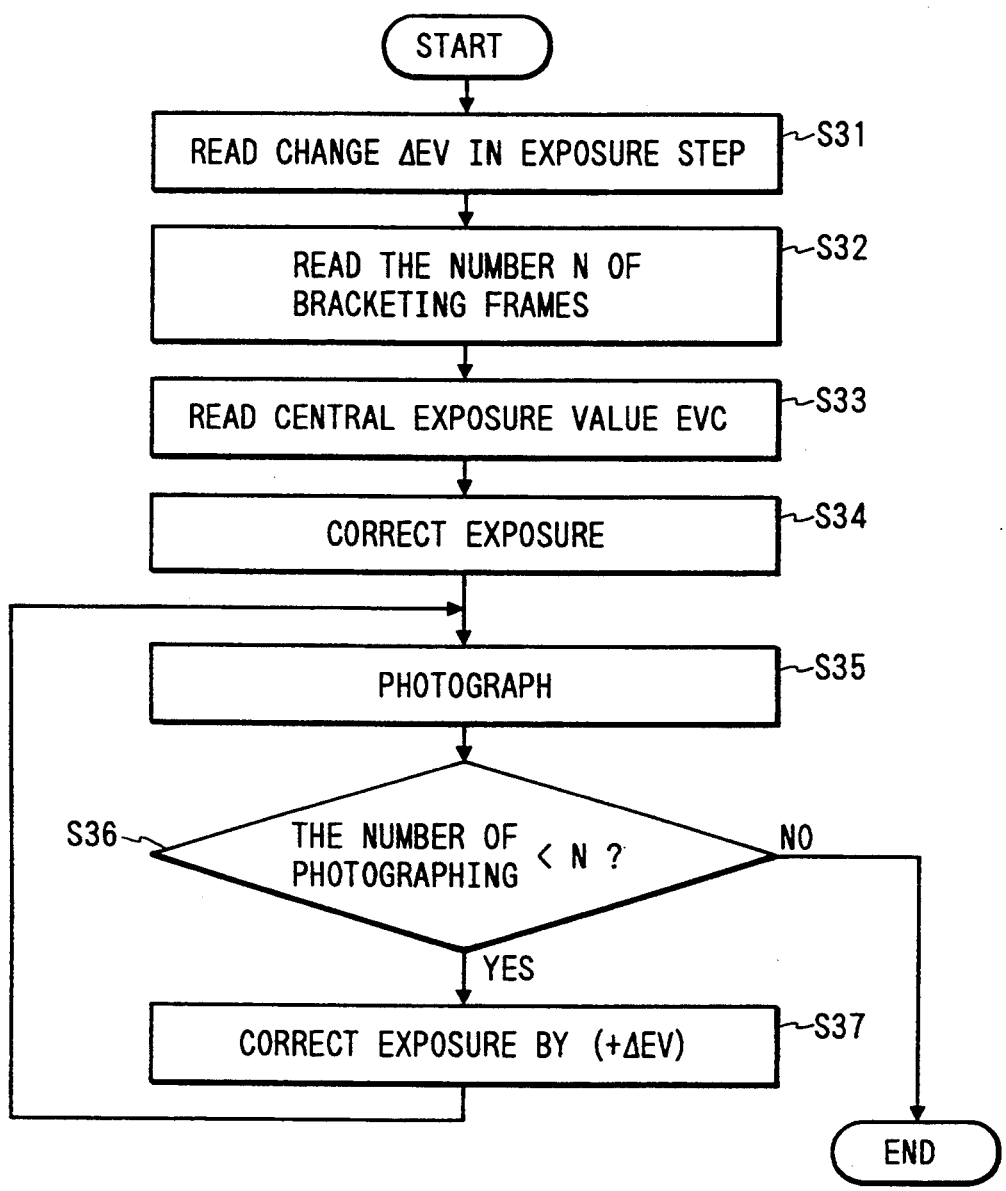

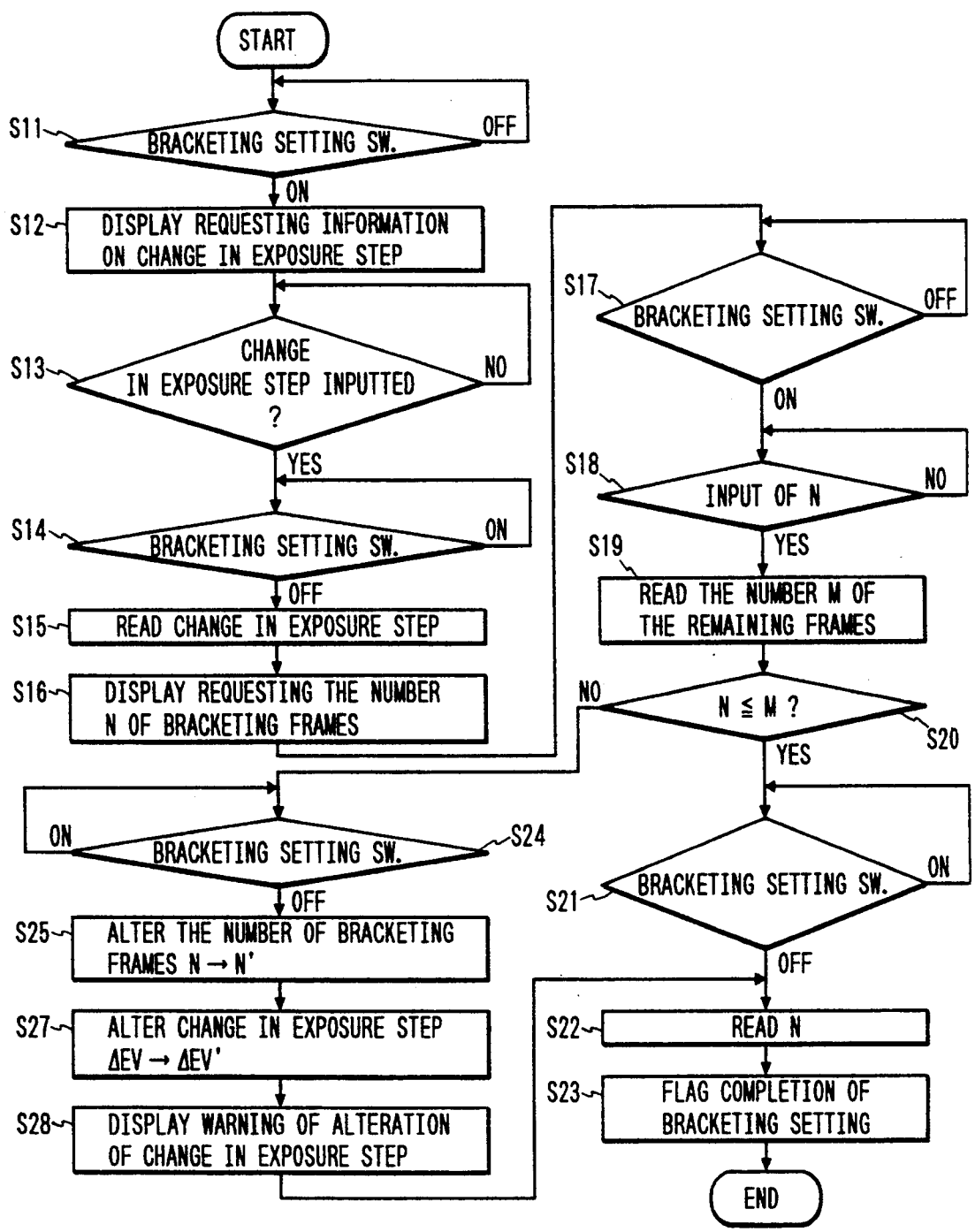

CAMERA WITH AUTOMATIC BRACKETING DEVICE

BACKGROUND OF THE INVENTION

1. Field of the Invention

The present invention relates to a camera with an automatic bracketing device which permits a plurality of frames of photographing with stepwise changes of exposure in a certain range of exposure condition.

2. Related Background Art

A so-called automatic bracketing function which permit automatic and continuous photographing a plurality of frames with a small fixed amount of change in exposure in a certain range of exposure condition which is considered proper when it is difficult to determine a proper exposure condition (shutter speed and iris aperture) of an object to be photographed, has been started to be adopted in a camera. (For example, see Japanese Laid-Open Patent Application No. 61-148437). This function usually allows any setting of stepwise changes of exposure and the number of frames to be photographed in group.

While the automatic bracketing function is effective in improving the precision of photographing, but since a plurality of frames are photographed at a time, if this function is selected when the remaining number of available frames is small, the film may reach its end in the course of photographing and the photographing may not be completed for the preset number of frames. If the bracketing photographing starts from an under-exposure end or an over-exposure end of the exposure range, a center exposure in the exposure range which may usually be a most proper exposure is not used for photographing.

SUMMARY OF THE INVENTION

It is an object of the present invention to solve a problem which is caused when the number of frames set to be photographed with an automatic bracketing device is larger than the number of remaining available frames.

The camera with the automatic bracketing function of the present invention comprises means (10, 11) for calculating the number of remaining available frames based on the number of available frames of the film loaded and the number of photographed frames, means (10, 13) for calculating a proper exposure, means (10, 15, 16) for setting the number of frames to be photographed in a bracketing photographing mode in which a plurality of frames are photographed with changing exposures, and means (10, 15, 16) for setting the number of steps of exposure to be changed in the bracketing photographing mode. When the set number of frames to be photographed is larger than the number of remaining available frames, the set number of frames to be photographed is automatically changed to a number which is no larger than the number of remaining available frames so that a frame with the proper exposure is photographed.

When the set number of frames to be photographed is automatically changed to the number no larger than the number of remaining available frames, the set number of steps of exposure is automatically changed so that the photographing is made while the upper limit and the lower limit of the exposure range are maintained.

In the present invention, when the number of frames to be photographed in the bracketing photographing mode is set larger than the number of remaining available frames, the number of frames to be photographed in the bracketing photographing mode is automatically changed to the number no larger than the number of remaining available films so that the film does not reach its end in the course of bracketing photographing and a frame with a proper exposure is not missed.

In the present invention, when the number of frames to be photographed in the bracketing photographing mode is automatically changed, the number of steps of exposure to be changed in the bracketing photographing mode is also automatically changed so that the bracketing photographing is made in the exposure range which the user initially intended.

In accordance with the present invention, when the number of frames to be photographed in the bracketing photographing mode is set larger than the number of remaining available frames, the number of frames to be photographed in the bracketing photographing mode is automatically changed to the number no larger than the number of remaining available films. Accordingly, the problem that the film reaches its end in the course of photographing or the frame with a center exposure is missed is solved.

In accordance with the present invention, when the number of frames to be photographed in the bracketing photographing mode is automatically changed, the number of steps of exposure to be changed in the bracketing photographing mode is also automatically changed. Accordingly, the bracketing photographing can be made in the exposure range which the user initially intended.

BRIEF DESCRIPTION OF THE DRAWINGS

FIG. 4 shows a flow chart of an automatic bracketing photographing process, and FIG. 5 shows a flow chart of another embodiment for setting a photographing condition when the automatic bracketing photographing is to be made.

DETAILED DESCRIPTION OF THE PREFERRED EMBODIMENTS

Figure 1:
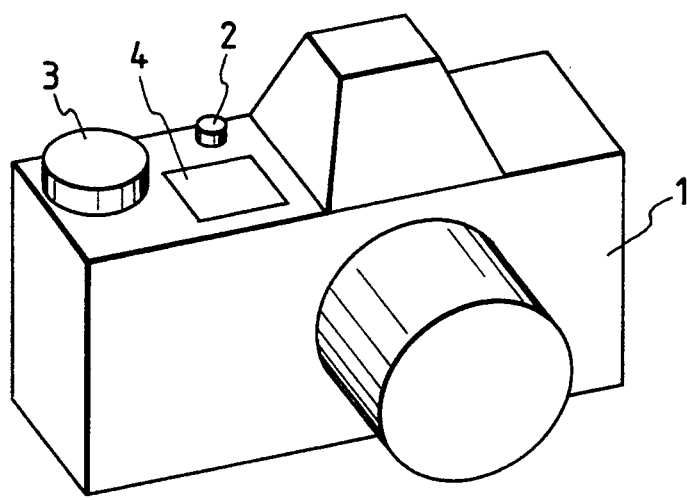
FIG. 1 shows an external schematic view of one embodiment of a camera with an automatic bracketing device of the present invention.

FIG. 1 shows an external schematic view of one embodiment of the camera with the automatic bracketing device of the present invention. Mounted on a top of a camera body 1 are a bracketing set button 2 for selecting a bracketing set mode, an input information setting dial 3 for entering various information such as the number of frames to be photographed in the bracketing photographing mode, and a liquid crystal display (LCD) 4, at least.

Figure 2:
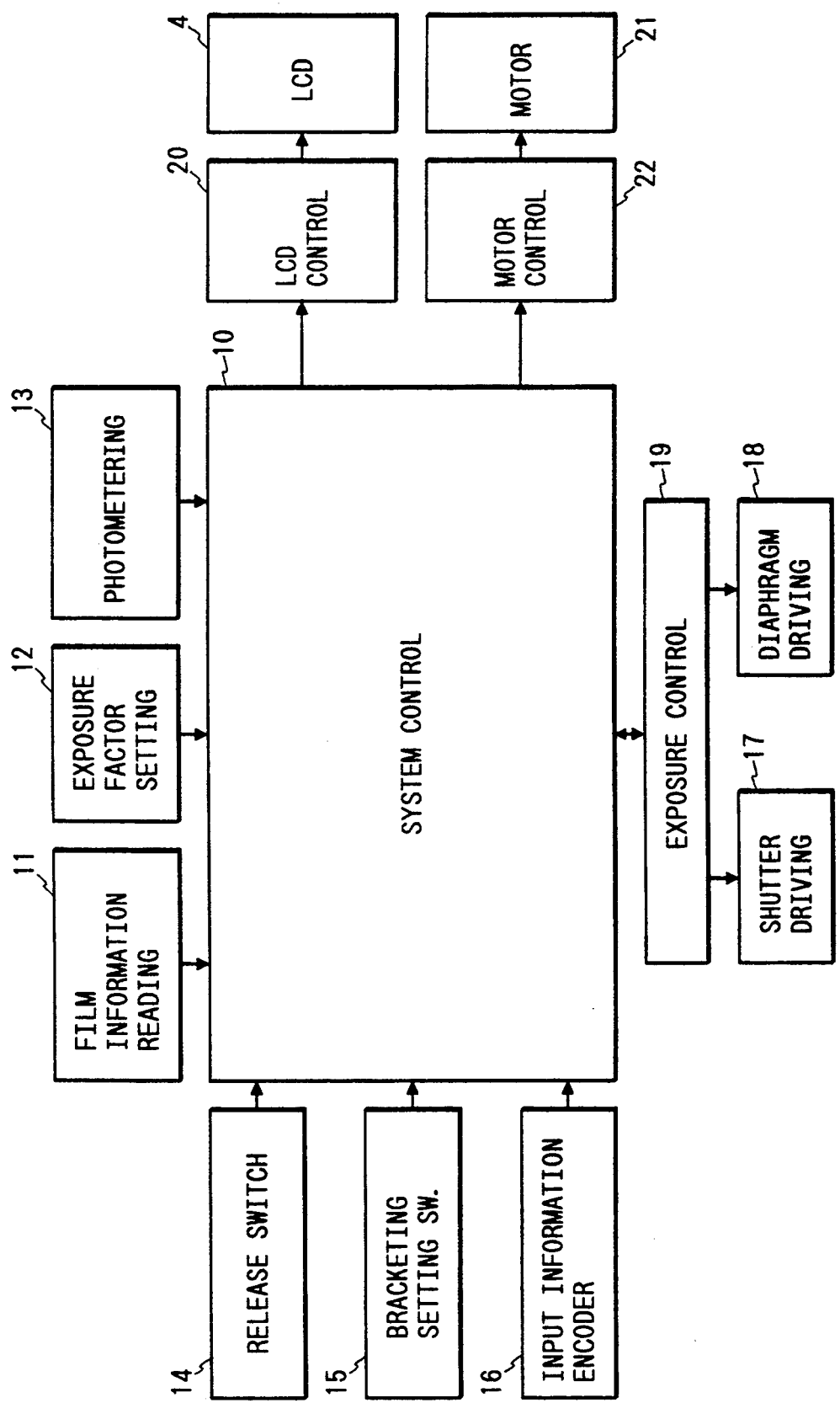
FIG. 2 shows a block diagram of one embodiment of a control unit of the camera with the automatic bracketing device of the present invention.

FIG. 2 shows a block diagram of one embodiment of a control unit of the camera with the automatic bracketing device of the present invention. The entire system is controlled by a system controller 10 which consists of a microcomputer.

Connected to the system controller 10 are a film information reader 11 for reading a film sensitivity and the number of available frames indicated on a cartridge of a film loaded, an exposure parameter setter 12 for setting an exposure mode such as a shutter priority mode or an iris priority mode, and a shutter speed and an iris aperture in the selected exposure mode, a photometering unit for detecting a brightness of an object, a release switch 14 for generating a release signal when a user depresses a release button, a bracketing setting switch 15 for generating a bracketing setting signal in response to the actuation of the bracketing setting button 2, an input information encoder 16 for generating a code signal in response to the rotation of the input information setting dial 3, an exposure controller 19 for controlling a shutter driver 17 and an iris driver 18 in accordance with a command from the system controller 10, an LCD controller 20 for controlling the display of the LCD 4 mounted on the top of the camera body 1, and a motor controller 22 for controlling a motor which charges the shutter and winds the film prior to the photographing.

Figure 3:
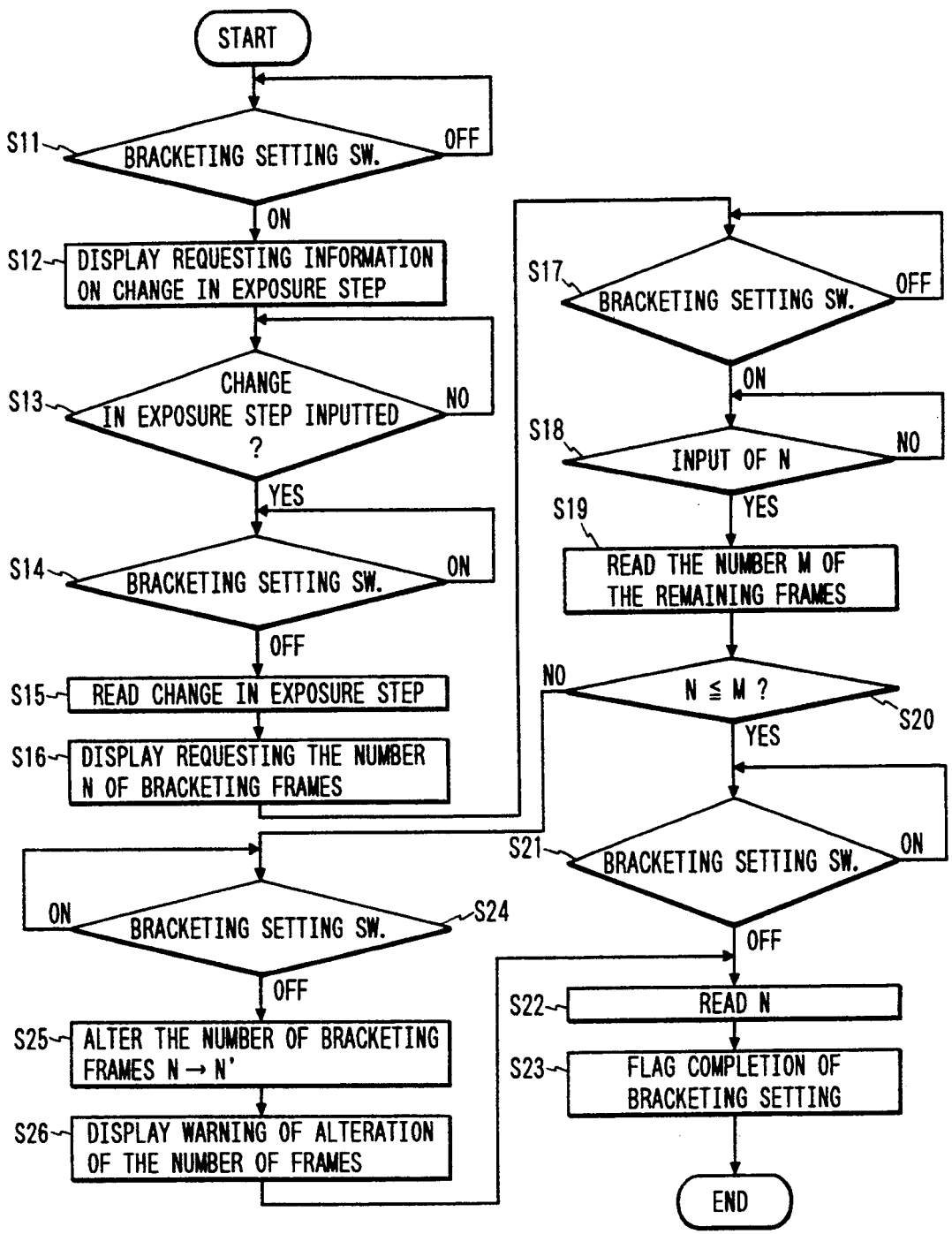
FIG. 3 shows a flow chart of setting a photographing condition when automatic bracketing photographing is to be made.

The setting of a photographing condition in the automatic bracketing photographing mode, that is, the setting of the number of steps of exposure to be changed and the number of frames to be photographed is now explained with reference to a flow chart of FIG. 3. The setting is made by turning the input information setting dial 3 while the bracketing setting button 2 is depressed.

First, whether the bracketing setting button 2 is depressed or not is determined. It is determined by checking whether the bracketing setting signal is generated by the bracketing setting switch 15 or not (step S11).

If the bracketing setting signal is generated, it means that the bracketing setting button 2 is depressed, and a request for inputting the number of steps of exposure to be changed is displayed on the LCD 4 (step S12), and whether the number $\Delta EV$ of steps of exposure to be changed has been inputted or not is determined (step S13). The number $\Delta EV$ of steps of exposure to be changed is inputted by generating a code signal by the input information encoder 16 in response to the rotation of the input information setting dial 3.

Then, whether the bracketing setting button 2 has been released or not is determined (step S14). If it has been released, the current code signal from the input information encoder 16 is read into the system controller 10 as the number $\Delta EV$ of steps of exposure to be changed (step S15).

After the number $\Delta EV$ of steps of exposure to be changed has been set, the number N of frames to be photographed is set. A request for inputting the number N of frames to be photographed is displayed on the LCD 4 (step S16), whether the bracketing setting button 2 is depressed or not is determined (step S17), and if it is depressed, whether the number N of frames to be photographed has been inputted or not is determined (step S18). The number N of frames to be photographed is inputted by generating a code signal by the input information encoder 16 by rotating the input information setting dial 3.

Next, the number M of remaining available frames stored in the system controller 10 is read (step S19). The number M of remaining available frames is equal to a difference between the number of available frames of the film which is read by the film information reader 11 and the number of photographed frames.

The input number N of frames to be photographed and the number M of remaining available frames are compared (step S20), and if $N \leq M$, whether the bracketing setting button 2 has been released or not is determined (step S21). The code signal from the input information encoder 16 at the time of the release is read into the system controller 10 as the number N of frames to be photographed (step S22). After the number N of frames to be photographed has been set, an end of bracketing setting flag is set and the series of steps are terminated (step S23).

In the Step S20, if $N > M$, it is necessary to change the number N of frames to be photographed to the number no longer than the number M of remaining available frames. Thus, after the bracketing setting button 2 has been released (step S24), the set number N of frames to be photographed is changed to a maximum odd number N' which is no larger than the number M of remaining available frames (step S25). The odd number is selected in order to make equal the number of frames of under-exposure relative to a center exposure frame and the number of over-exposure frames.

Then, a warning indicating the change of the number N of frames to be photographed to N' is displayed on the LCD 4 (step S26), the changed number N' of frames to be photographed is read into the system controller 10 (step S22), and the end of bracketing setting flag is set to terminate the process (step S23).

The number $\Delta EV$ of steps of exposure to be changed and the number N of frames to be photographed in the bracketing photographing mode are set by rotating the input information setting dial 3 while the bracketing setting button 2 is depressed. If the number N of frames to be photographed is larger than the number M of remaining available frames, the number N of frames is automatically changed so that the film does not reach its end in the course of photographing.

A process of bracketing photographing is now explained with reference to a flow chart shown in FIG. 4. In this process, the status of the end of bracketing setting flag is checked upon the depression of the release button, and if the end of bracketing setting flag has been set, the process is started. The number of frames to be photographed is an odd number so that the number of under-exposure frames and the number of over-exposure frames with respect to a proper exposure frame are equal. In the present embodiment, the photographing is started from the under-exposure end and the exposure is gradually changed toward the over-exposure end.

The number $\Delta EV$ of steps of exposure to be changed and the number N of frames to be photographed are read (steps S31 and S32). The number $\Delta EV$ of steps of exposure to be changed is set in the step S15, and the number N of frames to be photographed is set in the step S22.

Then, a proper exposure is calculated based on the brightness of the object measured by the photometering unit 13 and it is read as a center exposure value EVc (step S33). The center exposure value EVc is then corrected to an undermost exposure value of the exposure range (step S34) for use in the photographing (step S35). The exposure value EV is given by $$EV = EVc - \{(N-1)/2\} \times \Delta EV$$

Then, whether the number of times of photographing has reached the number N of frames to be photographed in the bracketing photographing mode or not is determined (step S36). If it has not reached the number N of frames, the number $\Delta EV$ of steps of exposure to be changed is added to the exposure value EV to increment the exposure by one step (step S37), and the next frame is photographed (step S35). The steps S34–S36 are repeated until the number of times of photographing reaches the number N of frames to be photographed, and when it reaches (step S35), the bracketing photographing mode is terminated.

Referring now to a flow chart of FIG. 5, another embodiment of setting the number ΔEV of steps of exposure to be changed and the number N of frames to be photographed is explained. In the present embodiment, when the input number N of frames to be photographed is changed to the maximum odd number N' which is no larger than the number M of remaining available frames, the number ΔEV of steps of exposure to be changed is also changed so that the photographing is made while a proper exposure range is maintained. In the process shown in FIG. 5, the steps S11–S25 are identical to the steps S11–S25 shown in FIG. 3 and the detailed explanation thereof is omitted.

In the step S20, if the input number N of frames to be photographed is larger than the number M of remaining available frames, that is, if N>M, the input number N of frames to be photographed is changed to the maximum odd number N' which is no larger than the number M of remaining available frames (step S25) after the bracketing setting button 2 has been released (step S24).

Then, in order to assure that the exposure range does not change from the initially set range even after the number N of frames to be photographed has been changed, the number ΔEV of steps of exposure to be changed is changed to ΔEV' (step S27). The new number ΔEV of steps of exposure to be changed is given by $$\Delta EV' = \{(N-1)/2\} \times \Delta EV / \{(N'-1)/2\}$$
$$= \{(N-1)/(N'-1)\} \times \Delta EV$$

Then, a warning of the change of the number of steps of exposure to be changed is displayed on the LCD 4 (step S28), and the change number N' of frames to be photographed is read into the system controller 10 (step S22), and the end of bracketing setting flag is set to terminate the process (step S23).

In the present embodiment, when the number N of frames to be photographed in the bracketing photographing mode is changed to N', the number ΔEV of steps of exposure to be changed is also changed to ΔEV' so that the exposure range does not change from the initial range.

What is claimed is:

1. A camera with an automatic bracketing device, comprising:
    means for setting a number of frames of film to be exposed in a bracketing photographing mode in which a plurality of frames of the film are exposed with changing exposures;
    means for setting a number of steps for exposure to be changed in the bracketing photographing mode;
    means for calculating a proper exposure;
    means for calculating a number of remaining available frames for bracketing photographing based on the number of available frames of the film and the number of exposed frames of the film; and
    means for changing the number of frames to be exposed in the bracketing photographing mode to a maximum odd number no larger than the number of remaining available frames when the number of frames set for bracketing photographing is larger than the number of remaining available frames, so that a frame with a proper exposure is assured.

2. A camera with an automatic bracketing device according to claim 1 further comprising means for changing the number of steps for exposure in the bracketing photographing mode when the number of frames for bracketing photographing is changed, so that photographing is performed within a predetermined exposure range.

3. A method of bracketing photography in a camera having an automatic bracketing device, comprising:
    setting a number of steps for exposure of film in a bracketing photographing mode in which a plurality of frames of the film are exposed with changing exposures;
    setting a number of frames to be exposed in the bracketing photographing mode;
    calculating a proper exposure;
    calculating a number of remaining available frames for bracketing photographing based on the number of available frames of the film and the number of exposed frames of the film; and
    changing the number of frames to be exposed in the bracketing photographing mode to a maximum odd number no larger than the number of remaining available frames when the number of frames set for bracketing photographing is larger than the number of remaining available frames, so that a frame with a proper exposure is assured.

4. A method according to claim 3 further comprising changing the number of steps for exposure when the number of frames set for bracketing photographing is changed so that photographing is performed within a predetermined exposure range.

* * * * *